United States Patent
Ramirez Corredores et al.

(10) Patent No.: US 10,487,267 B2
(45) Date of Patent: Nov. 26, 2019

(54) PROCESS FOR ENHANCING PROCESS PERFORMANCE DURING THE THERMOCATALYTIC TREATMENT OF BIOMASS

(71) Applicant: Inaeris Technologies, LLC, Pasadena, TX (US)

(72) Inventors: Maria Magdalena Ramirez Corredores, Houston, TX (US); Leslie May, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 719 days.

(21) Appl. No.: 14/634,286

(22) Filed: Feb. 27, 2015

(65) Prior Publication Data

US 2015/0240166 A1    Aug. 27, 2015

Related U.S. Application Data

(60) Provisional application No. 61/945,351, filed on Feb. 27, 2014.

(51) Int. Cl.

| | |
|---|---|
| *G05B 21/00* | (2006.01) |
| *C10B 57/10* | (2006.01) |
| *C10B 53/02* | (2006.01) |
| *C10B 57/08* | (2006.01) |
| *C10B 57/06* | (2006.01) |

(52) U.S. Cl.
CPC .............. *C10B 57/10* (2013.01); *C10B 53/02* (2013.01); *C10B 57/06* (2013.01); *C10B 57/08* (2013.01); *Y02E 50/14* (2013.01); *Y02P 20/145* (2015.11)

(58) Field of Classification Search
CPC .. D21C 1/00; C12P 7/08; C10G 47/00; C10B 53/02; C10B 57/10
USPC ......... 435/277, 163; 208/108, 111.15, 111.1, 208/111.01, 111.2, 111.25, 111.3; 201/2.5; 700/272, 271, 273
See application file for complete search history.

(56) References Cited

U.S. PATENT DOCUMENTS

| | | | |
|---|---|---|---|
| 8,168,840 | B2 | 5/2012 | Brady et al. |
| 8,580,541 | B2 | 11/2013 | Yang et al. |
| 2011/0087470 | A1 | 4/2011 | Hames et al. |
| 2012/0022240 | A1 | 1/2012 | Belanger et al. |
| 2012/0144730 | A1 | 6/2012 | Stamires et al. |
| 2012/0160658 | A1 | 6/2012 | Bartek et al. |
| 2012/0190062 | A1 | 7/2012 | O'Connor et al. |
| 2013/0043192 | A1* | 2/2013 | Smith ................ B01D 17/0208 210/708 |
| 2013/0304546 | A1 | 11/2013 | Carlin et al. |

OTHER PUBLICATIONS

Van Parijs, et al., "Modeling Lignin Polymerization. I. Simulation Model of Dehydrogenation Polymers", Plant Physiology, Jul. 2010, vol. 153, pp. 1332-1344.

* cited by examiner

*Primary Examiner* — Natalia Levkovich

(74) *Attorney, Agent, or Firm* — John Wilson Jones; Jones Delflache LLP

(57) ABSTRACT

A process for enhancing the conversion of biomass into a bio-oil containing liquid feed wherein the processability index, PI, of the biomass is optimized prior to introducing the biomass into the biomass conversion unit where catalytic pyrolysis of the biomass occurs. The PI is dependent on the ratio (S/G) between the S-unit population and the G-unit population of the biomass as well as the weight percent acetate, the weight percent alkaline (Group I metals), the weight percent of non-metals in the biomass of Group 15, Group 16 and Group 17 elements, the weight percent of metalloids (Group 13 and Group 14 elements), the weight percent xylan and the weight percent of alkaline earth (Group II metals) in the biomass feedstream.

22 Claims, 1 Drawing Sheet

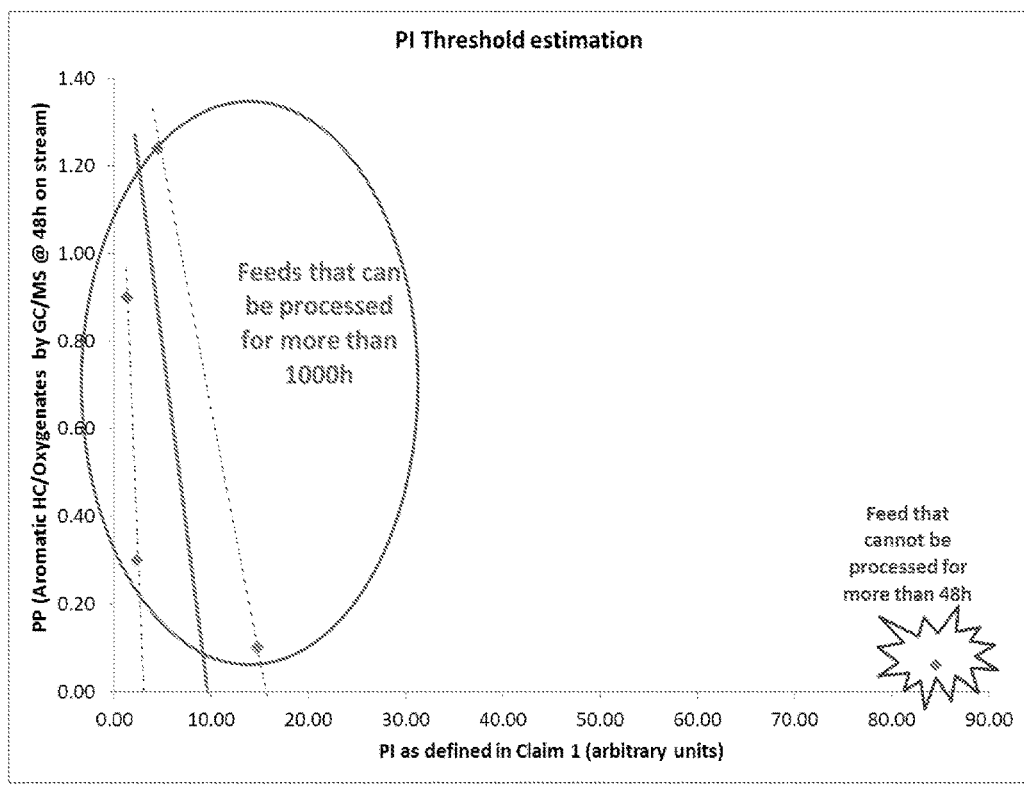

PROCESS FOR ENHANCING PROCESS PERFORMANCE DURING THE THERMOCATALYTIC TREATMENT OF BIOMASS

This application claims the benefit of U.S. patent application Ser. No. 61/945,351, filed on Feb. 27, 2014.

FIELD OF THE DISCLOSURE

The disclosure relates to a process of improving the efficiency of catalytic pyrolysis of a selected biomass feed by pre-treating the biomass until an optimized processability index, PI, is attained.

BACKGROUND OF THE DISCLOSURE

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. One such conversion process is catalytic pyrolysis wherein liquid products are produced that spontaneously separate into an aqueous phase and a liquid organic phase. The liquid organic phase is commonly referred to as bio-oil. While catalytic pyrolysis produces high yields of bio-oil, most, if not all, of the bio-oil produced is of low quality due to the presence of high levels of reactive organic molecules as well as solids including char, inorganics from biomass, scale from processing equipment and fines from heat transfer agents and catalysts.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there is a need for improving the efficiency of catalytic pyrolysis of a biomass feedstock which maximizes the quality and yield of the produced bio-oil having one or more of the attributes or capabilities described or shown in, or as may be apparent from, the other portions of this patent.

SUMMARY OF THE DISCLOSURE

In some embodiments, the present disclosure involves a process of improving the efficiency of catalytic pyrolysis of a cellulosic biomass feedstream. In the process, the processability index, PI, of a biomass feedstream to be subjected to catalytic pyrolysis is first determined by the equation:

$$PI = 100 * \frac{\left(\frac{S}{G}\right) * (\% \text{ acetate}) * (\text{Alkaline} + \text{Non-metal} + \text{Metalloids})^2}{(\% \text{ xylan}) * (\text{Alkaline Earth})} \quad (I)$$

where:

S/G is the ratio between S-units population and G-unit population in the lignin component of the biomass feedstream;

% acetate is the weight percent of acetate in the biomass feedstream;

Alkaline is the total amount of Group I metals in the biomass feedstream, in weight percent;

Non-metal is the amount of Group 15, Group 16 and Group 17 elements in the biomass feedstream, in weight percent;

Metalloids is the amount of Group 13 and Group 14 elements in the biomass feedstream, in weight percent;

% xylan is the weight percentage of xylan component in the biomass feedstream, in weight percent;

Alkaline earth is the total amount of Group II metals in the biomass feedstream, in weight percent.

A cellulosic biomass feedstream having a PI in excess of 15 is then subjected to physical processing for a time sufficient to lower the PI of the biomass feedstream. The treated biomass is then introduced into a biomass conversion reactor. The treated biomass is then subjected to catalytic pyrolysis.

In an embodiment of the disclosure, the lignin containing biomass feedstream may be demineralized by washing in an aqueous media or solvent during physical processing of the biomass.

In some embodiments of the disclosure, a fluid containing the biomass feedstream is subjected to pressure during the physical processing. The biomass feedstream may then be broken apart upon release of the pressure.

In some embodiments of the disclosure, the biomass feedstream is subjected to soaking in an aqueous fluid or in a solvent during physical processing.

In some embodiments of the disclosure, the biomass feedstream is subjected to swelling in an aqueous fluid or in a solvent during physical processing.

In some embodiments of the disclosure, the biomass feedstream is subjected to grinding during physical processing in order to render a biomass feedstream having smaller particle size.

In some embodiments of the disclosure, the biomass feedstream is blended with a second biomass feed; the PI of the second biomass feed being less than the PI of the lignin containing biomass feedstream.

In some embodiments of the disclosure, the biomass feedstream is subjected to drying, agitation, steaming, fractionating, extraction or demineralization or a combination thereof during physical processing.

In some embodiments of the disclosure, the biomass feedstream is impregnated with an acid, base or salt or a combination thereof during physical processing.

In some embodiments of the disclosure, the biomass feedstream is blended with softwood, softwood derivative, softwood forest residues, softwood whole trees, herbaceous biomass, herbaceous biomass derivative, herbaceous biomass residues, or a combination thereof during physical processing.

Accordingly, the present disclosure includes features and advantages which are believed to improve the efficiency of catalytic pyrolysis. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following FIGURES are part of the present specification, included to demonstrate certain aspects of various embodiments of this disclosure and referenced in the detailed description herein:

FIG. 1 illustrates the threshold value for the processability index, PI, defined herein, for conditioning the operability of catalytic pyrolysis of a biomass.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying FIGURES. It should be understood that the description herein and appended drawings, being of example embodiments, are not intended to limit the claims of this patent or any patent or patent application claiming priority hereto. On the contrary, the disclosure is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). As one skilled in the art will appreciate, different persons may refer to a component or process step by different names. This document does not intend to distinguish between components that differ in name but not function. Also, the terms "including" and "comprising" are used herein and in the appended claims in an open-ended fashion, and thus should be interpreted to mean "including, but not limited to . . . ."

The process disclosed herein improves the efficiency of the catalytic conversion of a biomass feedstream to a liquid bio-oil containing stream.

In an embodiment, the processability index, PI, of a lignin containing biomass feed prior to being introduced into a biomass conversion unit (such biomass being referred to herein as the "selected biomass feed") is first determined. In this embodiment, the ratio (S/G) between the S-unit population and the G-unit population in the biomass is assessed, as well as the weight percent of acetate, alkaline (Group I metals), non-metals (Group 15, Group 16 and Group 17 elements), metalloids (Group 13 and Group 14 elements), xylan and alkaline earth (Group II metals) in the selected biomass feed.

The principal components of biomass are lignin, cellulose and hemi-cellulose. Lignins are heterogeneous polymers derived from phenylpropanoid monomers, mainly the hydroxycinnamyl alcohols coniferyl alcohol (G-monomer) and sinapyl alcohol (S-monomer) and minor amounts of p-coumaryl alcohol (H-monomer). While each of these differ in their degree of methoxylation, the resulting units in the lignin polymer are the guaiacyl (G), syringyl (S) and p-hydroxyphenyl (H) units. A greater amount of S-units are typically found in hardwood than in softwood or herbaceous biomasses. A greater amount of G-units are typically found in softwood than in hardwood or herbaceous biomasses. The H-unit is more typically found in herbaceous biomass than in hardwood or softwood. Further, herbaceous biomasses typically have a higher concentration of metalloids than either hardwood or softwood. Elevated amounts of metalloids in the biomass increase PI. Xylan is the main component of hemi-cellulose constituted by a C5-sugar (xylose, a five carbon containing molecule, i.e. a pyranose) polymer and is typically at higher concentrations in hardwood than softwood and herbaceous biomass.

The unitless processability index, PI, may be defined by equation (I):

$$PI = 100 * \frac{\left(\frac{S}{G}\right) * (\% \text{ acetate}) * (\text{Alkaline} + \text{Non-metal} + \text{Metalloids})^2}{(\% \text{ xylan}) * (\text{Alkaline Earth})} \quad (I)$$

The PI is indirectly proportional to process performance of the biomass during catalytic pyrolysis. In other words, the lower the PI, the easier and steadier is the operation of the catalytic pyrolysis process.

Where the select biomass feed has a PI in excess of 15, the biomass may be subjected to physical processing until the PI is less than or equal to 15, preferably less than or equal to 10, more preferably less than or equal to 8.

The treated biomass is then introduced into the biomass conversion unit where it is subjected to catalytic pyrolysis. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, product gas recycled from the biomass conversion process or any combination thereof.

The biomass is solid comprising cellulosic materials, in particular lignocellulosic materials. Suitable lignocellulosic materials include hardwoods, hardwood derivatives, hardwood forest residues, hardwood whole trees or a combination thereof. The lignocellulosic material may also include softwoods, softwood derivatives, softwood forest residues, softwood whole trees, or a combination thereof. Further, the lignocellulosic material may be a herbaceous biomass, a herbaceous biomass derivative, a herbaceous biomass residue or a combination thereof.

In a preferred embodiment of the disclosure, the Group I metal within equation (I) is lithium, sodium, potassium, or a combination thereof.

In another preferred embodiment of the disclosure, the Group II metal within equation (I) is magnesium, calcium, strontium, or a combination thereof.

In another preferred embodiment, the metalloid within equation (I) is silicon, aluminum, tin, lead, or a combination thereof.

In another preferred embodiment, the non-metal within equation (I) is phosphorus, sulfur, arsenic, antimony, selenium, fluorine, chlorine, bromine, or a combination thereof.

The PI of the selected biomass feed may be decreased by various physical treatments. In addition to decreasing PI, the physical treatments may render a more reactive organic content of the biomass while removing unwanted contaminants.

Most of such pre-treatments improve the bulk accessibility in the particles of the biomass. Biomass feeds containing lignin are typically bundled and sealed by the protective coating provided by the lignin component. Direct exposure of the cellulose and hemicelluloses to chemical reagents or even to thermal conditions is typically prevented by the lignin and other foreign, noncellulosic substances present. The pre-treatments described enhance the accessibility of chemical agents and heat into the interior of the biomass particulates. These accessibility channels also create escape routes for the thermally-formed volatile biomass fragments to be released from the solid matrix and reach the catalyst pore system.

In an embodiment, the selected biomass feeds may be demineralized by washing the feedstream in an aqueous media or in a solvent. The water of the aqueous media may be generated in-situ in a system integrated with the biomass conversion reactor. The water may also be added to the selected biomass feed from an external source. The water may also be a combination of said water streams. In an embodiment, minerals present in the selected biomass feed may be dissolved and then partially removed with the solvent.

Preferably, the solvent has a pH equal or less than 7 since minerals present in the biomass are easily mobilized in low pH solvents.

A preferred solvent for use in demineralization is an aqueous solvent provided the aqueous solvent has a low mineral content so as to increase its demineralization properties. The aqueous solvent may comprise a mineral acid or an organic acid. Suitable organic acids include acetic acid and citric acid. It may also be desirable to add a chelant to the solvent to assist in the solubilization of certain minerals, in particular transition metals, such as iron. An example of a suitable chelant is a phosphate or an organic acid with chelating capabilities, such as a citric, tartaric, malic, oxalic, pyruvic or glyceric acid as well as mixtures thereof.

In an embodiment, the solvent may be the acidic pyrolysis products of solid biomass material. Pyrolysis of lignocellulosic material produces a significant amount of water soluble organic acids, in particular acetic acid. Such acids may be suitable for demineralization of the biomass.

In an embodiment of the disclosure, the lignin containing biomass feedstream may be subjected to extraction in order to lower the PI to less than 15. For instance, the minerals may be removed by introducing it to an extraction solvent. The extraction acid may be water or an acid as set forth above. Minerals present in the selected biomass feed may be dissolved in the solvent and then removed with the extraction solvent (in a liquid form).

Further, removal of the minerals from the biomass may be accomplished by other means known in the art for liquid/solid separation. For example, particles of the solid biomass material may be mixed with the solvent (such as any of the solvents referenced above) to form a slurry. The slurry may then be filtered to remove minerals and solvents.

Further, the selected biomass feed may be subjected to soaking in order to lower the PI. A solvent (such as any of the solvents referenced above) may be used to soak the biomass for a time sufficient for minerals to be extracted from the solid biomass material (generally, from about 15 minutes to several hours). The solvent may be drained out of the soaked biomass by gravity or by passing the slurry over a filter.

The selected biomass feed may also swelled in a solvent (such as any of the solvents referenced above). The paths of water and solute molecules follow into the bulk of the biomass involves existing structural pores, capillaries and voids between fibrillar elements. Like soaking, swelling widens the pores and capillaries of the biomass thereby creating passageways to the surface. In particular, as water molecules penetrate into the interior of biomass particles, they cause disruption of fibrillar associations and move into regions interlinking the crystallite ensembles forming the fibrils. Disruption of the lattice structure of the crystallites causes breaking of intraplanar and interplanar hydrogen bonds within the layers and the creation of accessible and reactive internal surfaces.

The interaction of water with the biomass can further be increased by the presence in the water of certain soluble salts such as salts of potassium, sodium, barium, manganese, magnesium, calcium, lithium and zinc as well as ammonium salts. This may enhance the rupturing of hydrogen bonds holding the fibril aggregates together thereby creating more reactive bulk surface areas.

In addition to water or solvents, the biomass may be swelled in the presence of salts, acids, bases, organic water soluble compounds and/or enzymes in order to allow different biomass components to move, dissolve or rearrange as well as to allow for greater diffusion of soluble (salt) ions and dissolved ions to penetrate into the interior of the biomass and between lattice layers. This, in turn, enhances the opening of intraplanar and interplanar hydrogen bonded links, thereby causing lattice transformation. Salts and inorganic bases are often preferred since they may provide maximum bulking or swelling of the biomass.

The rate and extent of swelling may substantially increase with increasing temperature. Thus, in an embodiment, a lignocellulosic biomass may be contacted with an aqueous fluid at an elevated temperature in the range of from about 100° F. to about 300° F. In another embodiment of the disclosure, a lignocellulosic biomass is contacted with an aqueous fluid at an elevated temperature greater than 200° F. and, preferably, at autogenous pressure.

Swelling of the biomass may also be optionally aided by pH control, application of mechanical action, the incorporation of additive(s) and temperature control.

The solvent may be removed from the swollen biomass by applying mechanical action. The mechanical action may be exerted by such equipment as high shear mixers, kneaders, colloid mills, planetary mixers, mix-mullers, extruders, pressure filters, centrifuges and/or ball mills as well as other comminuting equipment.

In still another embodiment, the PI of the selected biomass feed may be reduced by impregnating the biomass feedstream with an acid, base or salt or a combination thereof. Such effects may be imparted by swelling of the biomass with any of the materials referenced in the paragraphs above. When dried, not all liquids present in the swollen regions are allowed to escape. Such entrapment of the swelling agents and/or present solutes, like salts, is accompanied by some shrinkage of the biomass particles. Consequently, drying may entrap (encapsulate) chemical compounds which may form inclusion complexes within the pores, voids, capillaries, interfibrillar interstices of the biomass.

In another embodiment, the PI of the selected biomass feed may be reduced by solvent explosion wherein the selected biomass feed is contacted with a fluid at a temperature above the boiling point of the fluid. Upon release of the pressure, the fluid rapidly evaporates. Build-up of vapor pressure of the fluid within the biomass particles results in disruption of the texture of the particle. Examples of suitable fluids for solvent explosion include water, ammonia, and supercritical carbon dioxide.

In another embodiment, the selected biomass feed is contacted with a fluid under pressure. The pressure is then subsequently released. Upon contacting the solid biomass with the fluid, the fluid penetrates pores and cavities in the biomass material. Upon release of the pressure, the fluid rapidly migrates to the surface of the biomass particle, thereby rupturing the structure of the particle. Suitable fluids include gases, in particular a gas that is oxygen-poor (i.e., having a lower oxygen content than air) or substantially oxygen-free.

Further, the selected biomass feed containing water may be heated under autogenous pressure. Typically, the heating temperature is below about 300° F. Heating is often effective in opening the structure of the biomass material. The accessibility of the solid biomass material can be improved further by precipitously releasing the autogenous pressure resulting in a form of solvent explosion.

In another embodiment, the selected biomass feed may be subjected to grinding for a time sufficient for the particle size of the feedstream to be reduced. Particle sizes in the range of from 300 μm to 5 mm are typically preferred. Grinding further enables the removal of metalloids from the biomass. This may be attributable to the silicon containing particles (characteristically of larger size) to be segregated and then removed from the selected biomass feed.

Grinding is preferably carried out in equipment designed to exert mechanical action on the material. The grinder may be any device suitable for reducing the particle size of the biomass material such as a mixer, a ball mill, kneader, planetary mill, and the like. The grinder may also be a fluidized bed wherein collisions between the biomass particles and the catalyst particles effect the desired reduction of the biomass particle size. Such equipment may also be used to subject the selected biomass feed to agitation in order to reduce the PI.

In another embodiment, the selected biomass feed may be blended with one or more other biomass feedstreams having a PI less than the PI of the biomass feedstream. In an embodiment, the selected biomass feed may be blended with softwood, softwood derivatives, softwood forest residues, softwood whole trees, herbaceous biomasses, herbaceous biomass derivatives, herbaceous biomass residues or a combination thereof. For example, herbaceous biomasses (having low S units) may be blended with hardwood to decrease the amount of S-unit in the total blended biomass. Herbaceous biomasses having a high concentration of metalloids may be blended with softwood to lower the concentration of metalloids in the total blended biomass.

In another embodiment, the selected biomass feed may be subjected to drying. For instance, the selected biomass feed may be subjected to flash drying, vacuum drying or a combination thereof in order to improve accessibility in the particles of the biomass.

The PI of the selected biomass feed may further reduced by subjecting the selected biomass feed to fractionation as well as steam. Further, any of the processing steps may be conducted at an elevated temperature.

In an embodiment, the selected biomass feed may be heated to a temperature in the range of from about 60° F. to about 300° F., preferably in an oxygen-poor or substantially oxygen free atmosphere, in order to provide greater accessibility to the particles of the biomass. The term "oxygen-poor" refers to an atmosphere containing less oxygen than ambient air. In one embodiment the heating is carried out at a temperature in the range of from about 110° F. to about to 300° F.

Any of the physical processing steps disclosed herein may be used in combination with each other. In some instances, it is necessary to repeat physical processing steps in order to attain a PI less than 15.

The select biomass feed may be introduced into an analyzer for evaluation. The analyzer can be any device known in the art that is capable of measuring and analyzing the requisite parameters such as the makeup of the selected biomass feed. These include high performance liquid chromatography (HPLC), negative ion electrospray (ESI) and mass spectrometry (MS). Protocols established by the National Renewable Energy Laboratory (NREL) may be used to determine the chemical composition of the selected biomass feed. The S/G ratio may be determined by analytical methods, such as by MS.

The information gathered by the analyzer may then be relayed to a controller. For instance, the analyzer may assess the compositional property of the biomass feed such as the lignin content, mineral content, carbon content, hydrogen content, oxygen content, natural oil content (e.g., triglycerides), hemicellulose content, cellulose content, extractives content (e.g., terpenes), water content, and/or ratios of any two of the preceding properties. The parameters for providing the requisite PI are then determined. The optimal value for the parameters recited in Equation (1) to render a PI of less than or equal to 15 is relayed to the controller. The controller optimizes the values for providing the requisite PI of a treated feed. The selected biomass feed is then subjected to the processing conditions in order to provide the requisite compositional for the feed.

The treated biomass having a PI less than or equal to 15 may be fed into the biomass conversion unit. The biomass conversion unit may be a cyclone reactor, a stationary fluid bed reactor, a transported bed reactor, a fluidized bed reactor, an ablative reactor or a riser reactor. In a preferred embodiment, the biomass conversion unit is a biomass fluidized catalytic cracking (BFCC) unit.

Pyrolysis is conducted in the presence of a catalyst. Renewable biofuels may be prepared from the liquid bio-oil containing stream originating from the biomass conversion unit.

The catalyst may be a water-soluble material and may be added to the biomass material either as solid dry particles or by impregnating the solid biomass material with a solution of the catalytic material. In another embodiment, the catalyst is water-insoluble. The use of water insoluble catalytic materials offers the advantage of easy separation of the catalyst from the reaction product. It is also possible to use a combination of a water-soluble and a water-insoluble catalyst.

In one embodiment the catalytic material is an acid. Examples of suitable solid acids include zeolites, in particular zeolites-Y, ZSM-5, or a mixture thereof.

In an alternate embodiment the catalyst comprises an alumina, in particular gamma-alumina.

In yet another embodiment the catalyst comprises a solid base. Suitable examples include hydrotalcite; a hydrotalcite-like material; a clay; a layered hydroxy salt; a metal oxide; a metal hydroxide; a mixed metal oxide; or a mixture thereof. The term "hydrotalcite-like material" refers to layered anionic clays having the structure of hydrotalcite, and wherein either all or part of the divalent metal is not magnesium; or all or part of the trivalent metal is not aluminum; or both.

Catalytic pyrolysis of a biomass having a PI less than 15 provides a high liquid yield of the pyrolysis reaction, as well as a high quality of the liquid reaction product.

All percentages set forth in the Examples are given in terms of weight units except as may otherwise be indicated.

EXAMPLES

Three biomasses were analyzed and the components of each was determined by the protocols set forth in Sluiter, et al., Compositional Analysis of Lignocellulosic feedstocks Review and Description of Methods. Journal of Agricultural and Food Chemistry 2010. 58 (16), 9043-9053. The S/G ratio of each of the biomasses was determined by NMR methods by the protocol set forth in Rencoret, et al., Structural Characterization of Milled Wood Lignins From Different Eucalypt Species. Holzforschung 2008. 62 (5), 514-526 and the inorganic element were determined by conventional XRF methods. The results of the analyses are set forth in Table I, wherein the % refers to weight percent:

TABLE I

| Ex. No. | % Xylan | S/G | % Acetate | % Alkaline Earth | % Alkaline | % Metalloids | % Non-metal | PI | PP, 48 hrs |
|---|---|---|---|---|---|---|---|---|---|
| 1 | 8 | 0.2 | 2 | 0.230 | 0.056 | 0.200 | 0.015 | 1.30 | 0.90 |
| 2 | 8 | 0.2 | 2 | 0.120 | 0.061 | 0.200 | 0.010 | 2.30 | 0.30 |
| 3 | 14 | 1.7 | 4 | 0.650 | 0.040 | 0.200 | 0.010 | 4.53 | 1.24 |
| 4 | 14 | 1.0 | 4 | 0.570 | 0.330 | 0.200 | 0.010 | 14.76 | 0.10 |
| 5 | 21 | 0.6 | 3 | 1.300 | 0.410 | 3.000 | 0.170 | 84.50 | 0.06 |

The processability index, PI, by Equation (1) for each of the biomass samples. The PI is set forth in Table I. Each of the samples was then subjected to catalytic pyrolysis and the liquid product analyzed by conventional GC/MS. Conditions were adjusted in order to produce bio-oil with an oxygen content in the range of 14-25%. The same zeolite-based catalyst was used in all runs. The run for Example 5 had to be stopped after about 48 hours, due to operability issues. Among the most desired products are the aromatic hydrocarbons. The remaining oxygenated hydrocarbons represent some of the catalyst inefficiencies. Hence, for comparative purposes the ratio of [aromatics]/[oxygenates] after 48 hours on stream was taken as an assessment of process performance (PP). The PP for each biomass sample is set forth in the last column of Table I. The effect of pretreatment on processability of a given biomass could be easily derived by observing the changes in PP. The values of PP and PI were then plotted in order to define threshold values for PI that condition the operability of catalytic pyrolysis. These results are shown in FIG. 1. Operability problems start to occur when the value of PI is about 15. Thus, a PI of 15 is the threshold value from which a two-stage process of the present disclosure is preferred.

While exemplary embodiments of the disclosure have been shown and described herein, many variations, modifications and/or changes of the process such as physical processing operations to lower PI may be used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A process of improving the efficiency of catalytic pyrolysis of a lignin containing biomass feedstream, the process comprising:
  (a) subjecting a biomass feedstream having a predetermined processability index, PI, in excess of 15 to physical processing, wherein $$PI = 100 * \frac{\left(\frac{S}{G}\right) * (\% \text{ acetate}) * (\text{Alkaline} + \text{Non-metal} + \text{Metalloids})^2}{(\% \text{ xylan}) * (\text{Alkaline Earth})} \quad (I)$$

where parameters:
  S/G is the ratio between S-units and G-units in the lignin of the biomass feedstream;
  % acetate is the weight percent of acetate in the biomass feedstream;
  alkaline is the total amount of Group 1 metals in the biomass feedstream, in weight percent;
  non-metal is the amount of Group 15, Group 16 and Group 17 elements in the biomass feedstream, in weight percent;
  metalloids is the amount of Group 13 and Group 14 elements in the biomass feedstream, in weight percent;
  % xylan is the weight percentage of xylan component in the biomass feedstream, in weight percent;
  alkaline earth is the total amount of Group 2 metals in the biomass feedstream, in weight percent; and further wherein
  the physical processing comprises at least one of the following:
    (i) demineralizing the biomass feedstream by washing in an aqueous media or in a solvent;
    (ii) subjecting a fluid containing the biomass feedstream to pressure and breaking the biomass feedstream apart upon release of the pressure;
    (iii) soaking the biomass feedstream in an aqueous fluid or in a solvent;
    (iv) swelling the biomass feedstream in an aqueous fluid or in a solvent;
    (v) grinding the biomass feedstream to a smaller particle size;
    (vi) blending the biomass feedstream with a second biomass feed wherein the PI of the second biomass feed is less than the PI of the biomass feedstream;
    (vii) drying the biomass feedstream;
    (viii) agitating the biomass feedstream;
    (ix) steaming the biomass feedstream;
    (x) fractionating the biomass feedstream;
    (xi) extracting the biomass feedstream; or
    (xii) impregnating the biomass feedstream with an acid, base or salt or a combination thereof;
  (b) introducing the treated biomass of step (a) to an analyzer and assessing the composition of the treated biomass;
  (c) relaying the assessed treated biomass of step (b) into a controller and optimizing the parameters in (I) for PI;
  (d) determining the PI of the treated biomass from the optimized parameters;
  (e) repeating (i) the physical processing defined in step (a) and (ii) steps (b) to (d) until the PI of the treated biomass is less than or equal to 15; and
  (f) introducing the treated biomass of step (e) having PI less than or equal to 15 to a biomass conversion reactor and subjecting the treated biomass to catalytic pyrolysis in the biomass conversion reactor.

2. The process of claim 1, wherein the PI of the treated biomass introduced into the biomass conversion reactor in step (f) is less than 10.

3. The process of claim 1, wherein the PI of the treated biomass introduced into the biomass conversion reactor in step (f) is less than 8.

4. The process of claim 1, wherein the Group 1 metal is lithium, sodium, potassium, or combination thereof.

5. The process of claim 1, wherein the Group 2 metal is magnesium, calcium, strontium, or combination thereof.

6. The process of claim 1, wherein the metalloid is silicon, aluminum, tin, lead, or combination thereof.

7. The process of claim 1, wherein the non-metal is phosphorus, sulfur, arsenic, antimony, selenium, fluorine, chlorine, bromine, or a combination thereof.

8. The process of claim 1, wherein the biomass feedstream comprises cellulose.

9. The process of claim 1, wherein the biomass feedstream comprises a lignocellulosic material.

10. The process of claim 9, wherein the lignocellulosic material is hardwood, hardwood derivatives, hardwood forest residues, hardwood whole trees or a combination thereof.

11. The process of claim 9, wherein the lignocellulosic material is softwood, softwood derivatives, softwood forest residues, softwood whole trees or a combination thereof.

12. The process of claim 9, wherein the lignocellulosic material is herbaceous biomass, herbaceous biomass derivatives, herbaceous biomass residues or a combination thereof.

13. The process of claim 1, wherein the physical processing which the biomass feedstream is subjected in step (a) is grinding, demineralization, drying, or a combination thereof.

14. The process of claim 13, wherein the drying is carried out by flash drying, vacuum drying, or combination thereof.

15. The process of claim 1, wherein the physical processing which the biomass feedstream is subjected in step (a) is demineralizing by washing in an aqueous media or in a solvent.

16. The process of claim 15, wherein the aqueous media is generated in-situ in a system integrated with the biomass conversion reactor.

17. The process of claim 1, wherein the physical processing which the biomass feedstream is subjected in step (a) is contacting with a fluid under pressure and wherein the biomass is broken apart upon release of the pressure.

18. The process of claim 1, wherein the physical processing which the biomass feedstream is subjected in step (a) is swelling in the presence of an aqueous fluid or solvent.

19. The process of claim 1, wherein the treated biomass is subjected to catalytic pyrolysis in step (f) in the presence of nitrogen, carbon dioxide, steam, hydrogen or carbon monoxide.

20. The process of claim 1, wherein the analyzer is high-performance liquid chromatography, negative ion electrospray and/or mass spectrometry.

21. The process of claim 1, wherein the composition determined by the analyzer in step (b) is the lignin content, mineral content, carbon content, hydrogen content, oxygen content, natural oil content, and hemicellulose content, cellulose content, extractives content, water content, and/or ratio of any of the same.

22. The process of claim 1, wherein the biomass feed in step (f) is subjected to catalytic pyrolysis in an oxygen-poor or substantially oxygen free atmosphere.

* * * * *